June 26, 1973           J. M. BILHORN           3,741,814
BATTERY HAVING WRAPPER COMPRISING LAMINATES OF
METAL AND ELECTRICALLY CONDUCTIVE PLASTIC
Filed Dec. 21, 1970
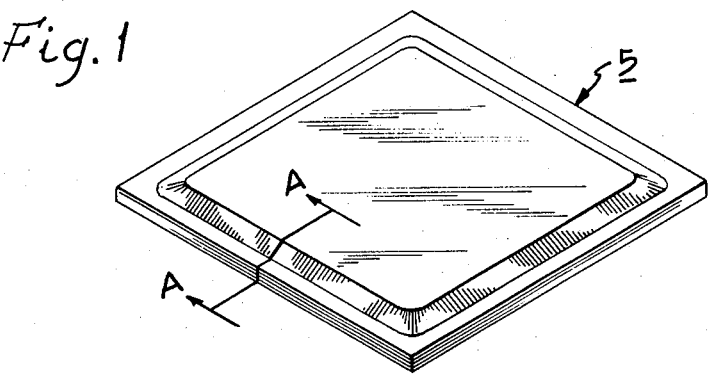
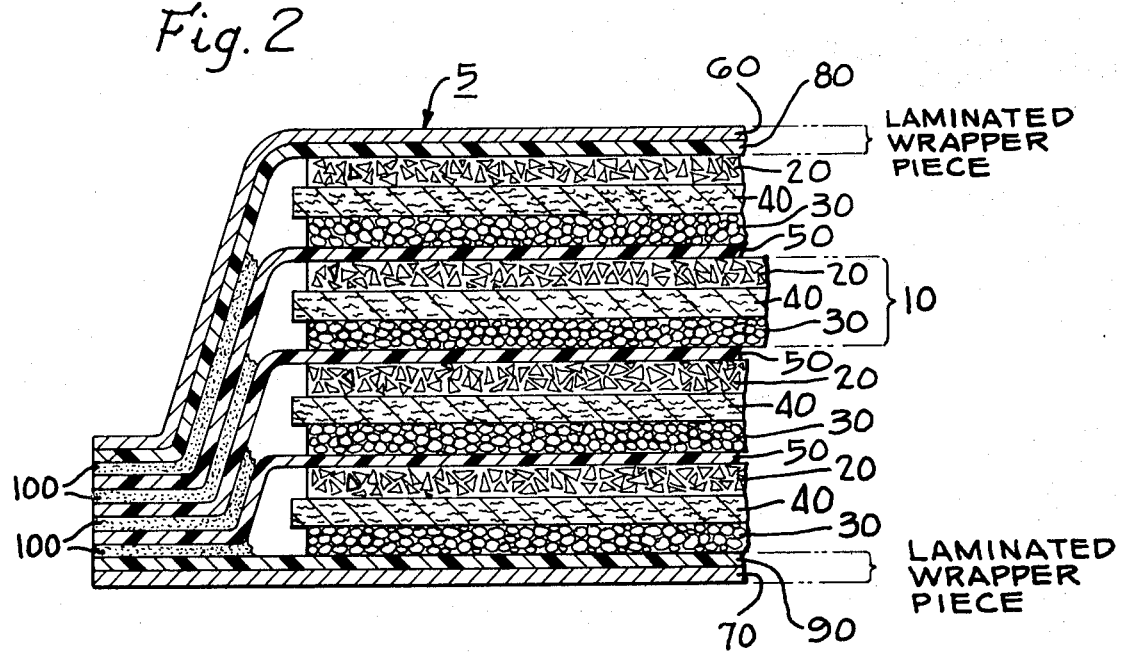

3,741,814
BATTERY HAVING WRAPPER COMPRISING LAMINATES OF METAL AND ELECTRICALLY CONDUCTIVE PLASTIC
John M. Bilhorn, Edgerton, Wis., assignor to ESB Incorporated
Filed Dec. 21, 1970, Ser. No. 99,985
Int. Cl. H01m 21/00
U.S. Cl. 136—111                 8 Claims

ABSTRACT OF THE DISCLOSURE

A battery has a wrapper consisting of two pieces sealed around their perimeters. Each wrapper piece comprises a laminate of metal and electrically conductive plastic, the conductive plastic in each of the laminates being in contact with an end electrode within the battery. The wrapper pieces are closed around their perimeters to produce a liquid impervious sealed battery. Preferably, the metal in each of the two wrapper laminates comprises a foil of steel. The laminated wrapper pieces may be used to enclose either multi-cell or single cell batteries.

BACKGROUND OF THE INVENTION

(1) Field of the invention

This invention concerns wrappers for batteries which are made from laminates of metal and electrically conductive plastic. The electrically conductive plastic faces of the laminates are positioned toward the interior of the battery and are in contact with the end electrodes.

(2) Description of the prior art

Flat, dry cell type batteries have often been wrapped in electrically nonconductive plastic, the plastic serving both as a liquid barrier to prevent the escape of liquids from inside the battery and as an electrical insulator. Inside these plastic wrappers were a pair of electrically conductive current conductors, one electrically connected to the positive electrode at one end of the battery and the other electrically connected to the negative electrode at the other end of the battery. The current conductors extend to the exterior of the wrapper by going through or around the edge of the nonconductive plastic. The current conductors were frequently metallic, in which case it was often necessary to interpose a deposit of electrically conductive adhesive between the positive electrode at one end of the battery and the metallic current conductor electrically connected to that electrode in order to prevent undesired electrochemical reactions from occurring. For illustrations of such prior art constructions, see U. S. Pats. #2,745,894 and 3,379,574.

Summary of the Invention

With this invention, a battery is enclosed in a pair of laminated pieces which are sealed to produce a liquid impervious closure around the perimeter of the electrodes. Each wrapper piece comprises a laminate of metal and electrically conductive plastic, the conductive plastic in each of the laminates being positioned toward the interior of the battery and being in contact with one of the outermost electrodes. Preferably, the metal in each of the two wrapper laminates is a thin foil of steel, but alternatively, the metal may consist of foils, flame or vapor spray deposits, or electrodeposits of other metals.

BRIEF DESCRIPTION OF THE DRAWINGS

FIG. 1 is a pictorial view of a multicell battery having the laminated wrapper of this invention.

FIG. 2 illustrates a cross-section of the battery shown in FIG. 1 taken along the line A—A of FIG. 1. The thickness of the battery is shown greatly magnified for purposes of illustration.

DESCRIPTION OF THE PREFERRED EMBODIMENTS

FIG. 1 shows a multicell battery 5 in a pictorial view. FIG. 2 shows a portion of the multicell battery 5 in magnified cross-section. As FIG. 2 shows, the battery 5 comprises the combination of at least two cells 10, each such cell comprising a positive electrode 20, a negative electrode 30, and an electrolyte impregnated separator 40 between the positive electrode 20 and the negative electrode 30. Between each adjacent pair of cells 10 is an impervious intercell connector 50. Around the perimeter of each intercell conductor are sealing means 100 which provide a liquid impervious seal around each cell 10. A single cell battery similar to the one shown in FIG. 2 would contain only one cell 10 and no intercell connectors.

The multicell battery also requires a liquid impervious wrapper to be sealed around the outermost cells. As it pertains to the present invention, that wrapper consists of two pieces, each of which comprises a laminate of metal and electrically conductive plastic. FIG. 2 illustrates these two wrapper pieces, one piece 60–80 comprising a laminate of metal 60 and electrically conductive plastic 80 in which the plastic 80 is in contact with the positive electrode 20 in one of the end cells and the other piece 70–90 comprising a laminate of metal 70 and electrically conductive plastic 90 in which the plastic 90 is in contact with the negative electrode 30 in the other end cell. One advantage of the laminated wrapper pieces is that conductive plastics may be placed in direct contact with the electrodes so that the plastics function as current conductors. It will be noted that the conductive plastic will not produce any undesired electrochemical reactions when placed in direct contact with the positive electrode, and so it is unnecessary to interpose between them a deposit of conductive adhesive to prevent such reactions.

Another advantage of the laminated wrapper pieces is the relative conductivities of the conductive plastics and the metals. Conductive plastics tend to be good conductors of electricity in their transverse direction, that is, across their thicknesses, but they are poorer conductors of electrical current in their longitudinal direction. The metal, on the other hand, is a good conductor in all directions and is therefore well suited to collect current all along its interface with the adjacent conductive plastic and to conduct that current longitudinally to a terminal.

Still another advantage of the metal-conductive plastic laminates is their superior resistance to the penetration of moisture. One of the greatest limitations to long shelf life in a battery is the problem of having moisture from the electrolyte slowly escape from the battery before the battery is placed into service. One of the ways in which this moisture can escape is by penetration through the wrapper. The laminated wrapper pieces of this invention reduce the opportunities for such moisture penetration by providing a double moisture barrier around the battery. The inner plastic layers prevent the passage of moisture in the form of liquid, although the tiny pinholes which are occasionally found in plastics may allow the slow passage of vapors; but the outer metal layers, which are generally free of pinholes, act as vapor barriers. As shown in FIGS. 1 and 2, the metal in each wrapper piece is laminated to the conductive plastic over an area which is coextensive with all of the area inside of the moisture impervious sealing means 100. A further advantage of the metal in the laminated wrapper is the increased area on which to make terminal contacts. Additionally, foils allow thinner and more flexible constructions.

The metal layers 60 and 70 may be thin sheets or foils or alternatively they might be thin spray or vacuum deposits or electrodeposits. Preferably, however, the metals 60 and 70 are thin foils of steel. Such steel foils are readily available, relatively inexpensive, good electrical conductors, and are generally free of pinholes. They may also be laminated to some conductive plastics by the application of heat and pressure, without requiring any intermediary adhesives between them. The steel foils can be purchased in rolls of great length and are thus well suited for use in high speed, continuously operating production machinery.

While the present invention requires the use of an electrically conductive plastic, this invention is not limited to specific compositions of such plastics or to ways in which such plastics are manufactured. The conductive plastics may be produced by casting, extrusion, calendaring, or other suitable techniques. The conductive plastics may be made, for example, from materials such as polymers loaded with electrically conductive particles and containing various stabilizers and/or plasticizers, or from conductive polymers. The conductive particles may be carbonaceous materials such as graphite or acetylene black, or metallic particles may also be used. The conductive plastic, whether loaded or unloaded, must be made from a composition which is compatible with the other components of the battery. For batteries using LeClanche and moderately concentrated alkaline electrolytes, the conductive plastic may be made for example from materials such as polyacrylates, polyvinyl halides, polyacrylonitriles, copolymers of vinyl chloride and vinylidene chloride, and vinylidene chloride, polychloroprene, and butadiene-styrene or butadiene-acrylonitrile resins. For batteries using strongly alkaline electrolytes, polyvinylchloride and polyolefins such as polyethylene and polyisobutylene may be used in the preparation of the conductive plastic. For batteries using acid electrolytes such as sulfuric acid, polyvinyl halides, copolymers of vinyl chloride, and vinylidene chloride may be used.

The laminated wrapper pieces of this invention may, of course, also be used with single cell battereis. In such cases there is only one cell 10, there are no intercell connectors 50, and an electrically nonconductive sealing means such as sealer 100 shown in FIG. 2 must be used between the laminated wrapper pieces. Except for those changes, the remarks made above in regard to multicell batteries are applicable also to single cell batteries.

The composition of each of several of the other members in the battery may take alternative forms, and the composition of those members will now be discussed.

The positive electrodes 20 may comprise particles of electrochemically positive active material contained in and dispersed throughout a binder matrix. The positive active material conventionally is divided into tiny particles so as to increase the ratio of total surface area to weight in the active material and thereby increase the rate at which the electrochemical reactions can occur by increasing the surface areas where they occur. The binder increases the electronic conductivity and the structural integrity within the electrodes. Since electrolyte must have access to the surface of the active material particles, the electrode must be made sufficiently porous so that the electrolyte may diffuse throughout the electrode rapidly and thoroughly. Preferably the pores in the electrode are produced by the evaporation of liquid during the construction of the electrode; the evaporating liquid may be part of a dispersion binder system in which the solid binder contained in the finally constructed electrode comprises tiny particles of binder material dispersed throughout and not dissolved in the liquid while the electrode is being constructed, or the evaporating liquid may be part of a solution binder system in which the solid binder contained in the finally constructed electrode is dissolved in the liquid which is later evaporated. The porisity of the positive electrodes may be increased as the discharge rate desired in the battery is increased. Electrodes may also be constructed using combinations of the dispersion and solution systems. Alternatively, the pores might be produced by the dissolving of a solid which was present during construction of the electrode or by passing gases through or generating gases within the electrodes at controlled rates during electrode construction. The positive electrodes 20 may, and preferably will, also contain amounts of good electrical conductor such as carbon or graphite to improve the electrical conductivity between the active material particles, the positive active material particles themselves generally being relatively poor conductors of electricity. The conductivity of the active material particles together with the conductivity of the binder itself will influence the amounts of conductors added to the electrode. The electrodes 20 may also contain if desired small amounts of additional ingredients used for such purposes as maintaining uniform dispersion of active material particles during electrode construction, aiding the diffusion of electrolyte through the pores of the finally constructed electrodes, controlling viscosity during processing, controlling surface tension controlling pot life, or for other reasons.

The negative electrodes 30 may comprise spray or vapor deposits of metals or may comprise tiny particles of metals contained in and dispersed throughout a binder matrix. If the negative electrodes utilize a binder matrix, in general the same considerations regarding that matrix apply to the negative electrodes as do for the positive electrodes except that no electrical conductor may be needed to achieve desired electrical conductivity between the active material particles since the negative active materials are generally better conductors than are the positive materials. When the negative electrodes utilize a binder matrix, the binder system need not be the same as the one used in the positive electrodes, and even if it is the proportions of binder, active material particles, and other proportions of analogous ingredients in the positive electrode. The initial porosity of the negative electrodes may sometimes be less than that of the positive electrodes, since the negative electrode discharge reaction products are sometimes dissolved in the battery electrolyte. The porosity of the negative electrodes may be increased as the discharge rate desired in the battery is increased. The negative electrodes 30 may also comprise thin sheets or foils or electrodeposits of electrochemically negative material.

Between the two electrodes in each cell is an electrolyte impregnated separator 40, the theoretical requirements of which are that it contain electrolyte as well as physically separate and prevent contact between the electrodes. A deposit of gelled electrolyte could by itself serve both functions if of proper thickness and/or consistency. The alternative construction uses a deposit of gelled or fluid electrolyte with a separator which is distinct from and in addition to the electrolyte, the separator providing added insurance against direct contact between the electrodes and acting as an absorbent material into which the electrolyte may be impregnated. Both alternative constructions may, however, be viewed as being forms of electrolyte impregnated separators. Where the separator is distinct from an in addition to the electrolyte, the separator may be made from a wide variety of material including the fibrous and cellulosic materials which are conventional in battery construction as well as from woven or non-woven fibrous materials such as polyester, nylon, polypropylene, polyethylene and glass.

Between each consecutive pair of cells is an impervious intercell connector 50 which may take several different embodiments. Regardless of the specific embodiment, the impervious intercell connector 50 must meet three essential requirements: it must be impervious to the electrolyte of the battery so that one cell may be sealed off from the next; it must provide some means by which electrical current may be conducted between the positive electrode in one cell and the negative electrode in the next cell; and it must not create any undesired electrochemical reactions with the electrodes or other components of the battery.

The particular embodiment of the impervious intercell connector shown in FIG. 2 may be a sheet of electrically conductive plastic. Alternative embodiments of the impervious intercell connector may be achieved with metal foils, conductive adhesives or combinations of them, since with the use of metal foils it may be necessary or desirable to interpose a layer of conductive adhesive or other conductive polymer between the foil and the positive electrode 20 to prevent the foil from engaging in an undesired electro-chemical reaction with the positive electrode or the electrolyte. The impervious intercell connector 50 may also be a combination of an electrically nonconductive member such as plastic, with one or more members of electrically conductive material extending around the edge of or through the nonconductive member to conduct electrical current between the positive electrode in one cell and the negative electrode in the next consecutive cell.

Liquid impervious seals must be provided around each electrolyte impregnated separator 40 to prevent the escape of moisture from the interior of the battery. Adhesive means for achieving this sealing are shown in FIG. 2 as items 100. If the adhesive is made from an electrically nonconductive material, members 100 may serve an additional purpose, that of preventing undesired electrical connections between two or more electrically conductive members of the battery. Where the edges of the intercell connectors are themselves electrically nonconductive, as they may be in the case of intercell connectors comprising a combination of electrically nonconductive plastic with one or more conductive members extending around the edge of or through the nonconductive plastic, the nonconductive perimeters of the intercell connectors may serve as the sealing means by being sealed with the application of heat and/or pressure or by some other technique.

While it is preferred to employ the LeClanche electrochemical system (comprising manganese dioxide positive active material, zinc negative active material, and an electrolyte comprising ammonium chloride and/or zinc chloride), the battery 5 of this invention may employ a wide variety of positive and negative electrode materials and a wide variety of electrochemical systems including both primary and secondary systems. Among the positive electrode materials are such commonly used inorganic metal oxides as manganese dioxide, lead dioxide, nickel oxyhydroxide, mercuric oxide, and silver oxide, inorganic metal halides such as silver chloride and lead chloride, and organic materials capable of being reduced such as dinitrobenzene and azodicarbonamide compounds. Among the negative electrode materials are such commonly used metals as zinc, aluminum, magnesium, lead, cadmium, and iron. This invention may with appropriate electrodes employ the electrolytes commonly used in the LeClanche system (ammonium chloride and/or zinc chloride), various alkaline electrolytes such as the hydroxides or potassium, sodium, and/or lithium, acidic electrolytes such as sulfuric or phosphoric acid, nonaqueous electrolytes, the electrolytes of course being chosen to be compatible with the positive and negative electrodes.

Among the wide variety of electrochemical systems which may be used in the battery 5 are those in which the positive electrodes comprise manganese dioxide, the negative electrodes comprise metals such as zinc, aluminum, or magnesium, the electrolyte substantially comprises an acidic solution of inorganic salts. Another commonly known system useful in the battery 5 is the alkaline manganese system in which the positive eleectrodes comprise manganese dioxide, the negative electrodes comprise zinc, and the electrolyte substantially comprises a solution of potassium hydroxide. Other aqueous electrolyte systems including those of nickel-zinc, mercury-zinc, mercury-cadmium, and nickel-cadmium may also be used. Systems employing organic positive electrodes and acidic electrolytes may also be used, including rechargeable systems using azodicarbonamide compound electrodes and LeClanche electrolyte.

I claim:
1. An improvement in a multicell battery comprising the combination of:
   (a) at least two cells, each such cell comprising the combination of
       (i) a positive electrode,
       (ii) a negative electrode, and
       (iii) an electrolyte impregnated separator between and in contact with the two electrodes; and,
   (b) an intercell connector between each adjacent pair of cells, each intercell connector being sealed around its perimeter to provide a liquid impervious seal around each cell,
wherein the improvement comprises a current carrying wrapper enclosing the cells and intercell connectors which wrapper provides improved electrical conductivity and improved moisture retention, the wrapper consisting of two pieces each of which comprises a laminate of metal and electrically conductive plastic, the conductive plastic in one of the wrapper pieces being in contact with the positive electrode in one of the end cells and the conductive plastic in the other wrapper piece being in contact with the negative electrode in the other end cell, the wrapper pieces being sealed around their perimeters by moisture impervious, electrically nonconductive sealing means, the metal in each wrapper piece being laminated to the conductive plastic over an area which is coextensive with all of the area inside of the moisture impervious sealing means.

2. The improvement of claim 1 in which the metal in each of the two wrapper pieces comprises a foil of steel.

3. An improvement in a single cell battery comprising the combination of:
   (a) a positive electrode;
   (b) a negative electrode; and,
   (c) an electrolyte impregnated separator between and in contact with the two electrodes,
wherein the improvement comprises a current carrying wrapper enclosing the electrodes and separator which wrapper provides improved electrical conductivity and improved moisture retention, the wrapper consisting of two pieces each of which comprise a laminate of metal and electrically conductive plastic, the conductive plastic in one of the wrapper pieces being in contact with the positive electrode and the conductive plastic in the other wrapper piece being in contact with the negative electrode, the wrapper pieces being sealed around their perimeters by moisture impervious, electrically nonconductive sealing means, the metal in each wrapper piece being laminated to the conductive plastic over an area which is coextensive with all of the area inside of the moisture impervious sealing means.

4. The improvement of claim 3 in which the metal in each of the two wrapper pieces comprise a foil of steel.

5. The battery of claim 1 in which the positive electrodes comprise manganese dioxide active material, the negative electrodes comprise zinc active material, and the electrolyte comprises ammonium chloride and/or zinc chloride.

6. The battery of claim 2 in which the positive electrodes comprise manganese dioxide active material, the negative electrodes comprise zinc active material, and the electrolyte comprises ammonium chloride and/or zinc chloride.

7. The battery of claim 3 in which the positive electrodes comprise manganese dioxide active material, the negative electrodes comprise zinc active material, and the electrolyte comprises ammonium chloride and/or zinc chloride.

8. The battery of claim 4 in which the positive electrodes comprise manganese dioxide active material, the negative electrodes comprise zinc active material and the electrolyte comprises ammonium chloride and/or zinc chloride.

References Cited

UNITED STATES PATENTS

| | | | |
|---|---|---|---|
| 2,870,235 | 1/1959 | Soltis | 136—111 |
| 3,306,777 | 2/1967 | Reid et al. | 136—111 |
| 2,880,259 | 3/1959 | Honotny | 136—111 |
| 3,490,952 | 1/1970 | Balaquer | 136—111 |
| 3,442,709 | 5/1969 | Hayase | 136—111 |
| 3,440,105 | 4/1969 | Yamamoto et al. | 136—111 |

WINSTON A. DOUGLAS, Primary Examiner

C. L. LeFEVOUR, Assistant Examiner

U.S. Cl. X.R.

136—132